(12) United States Patent
Bancel et al.

(10) Patent No.: US 8,341,475 B2
(45) Date of Patent: *Dec. 25, 2012

(54) MICROPROCESSOR COMPRISING SIGNATURE MEANS FOR DETECTING AN ATTACK BY ERROR INJECTION

(75) Inventors: Frédéric Bancel, Lamanon (FR); Nicolas Berard, Trets (FR)

(73) Assignee: STMicroelectronics SA, Montrouge (FR)

( * ) Notice: Subject to any disclaimer, the term of this patent is extended or adjusted under 35 U.S.C. 154(b) by 43 days.

This patent is subject to a terminal disclaimer.

(21) Appl. No.: 13/019,143

(22) Filed: Feb. 1, 2011

(65) Prior Publication Data

US 2011/0126065 A1    May 26, 2011

Related U.S. Application Data

(63) Continuation of application No. 11/111,018, filed on Apr. 21, 2005, now Pat. No. 7,904,775.

(30) Foreign Application Priority Data

Apr. 21, 2004 (FR) .................................... 04 04183
Apr. 21, 2004 (FR) .................................... 04 04184

(51) Int. Cl.
*G01R 31/28* (2006.01)
(52) U.S. Cl. ...................................................... 714/732
(58) Field of Classification Search .................... 714/732
See application file for complete search history.

(56) References Cited

U.S. PATENT DOCUMENTS

| | | | |
|---|---|---|---|
| 5,006,787 A * | 4/1991 | Katircioglu et al. | 324/73.1 |
| 5,051,996 A | 9/1991 | Bergeson et al. | 371/22.4 |
| 5,157,782 A | 10/1992 | Tuttle et al. | 395/575 |
| 5,170,338 A | 12/1992 | Moritoki et al. | 364/131 |
| 5,218,605 A | 6/1993 | Low et al. | 371/16.1 |
| 5,253,255 A * | 10/1993 | Carbine | 714/734 |
| 5,659,678 A | 8/1997 | Aichelmann, Jr. et al. | 395/183.01 |
| 5,668,947 A * | 9/1997 | Batcher | 714/30 |
| 5,699,506 A | 12/1997 | Phillips et al. | 395/183.13 |
| 5,732,209 A | 3/1998 | Vigil et al. | 395/183.06 |
| 5,774,477 A | 6/1998 | Ke | 371/22.32 |
| 5,831,988 A | 11/1998 | Fagerness | 371/21.2 |
| 5,905,738 A | 5/1999 | Whetsel | 371/22.4 |
| 5,933,594 A | 8/1999 | La Joie et al. | 395/183.01 |
| 5,974,529 A | 10/1999 | Zumkehr et al. | 712/41 |
| 5,978,946 A * | 11/1999 | Needham | 714/732 |
| 5,993,055 A | 11/1999 | Williams | 371/22.4 |
| 6,006,345 A * | 12/1999 | Berry, Jr. | 714/718 |
| 6,032,265 A | 2/2000 | Oguro et al. | 714/9 |
| 6,038,667 A | 3/2000 | Helbig, Sr. | 713/200 |

(Continued)

FOREIGN PATENT DOCUMENTS

EP        1 161 725 B1    2/2003
(Continued)

*Primary Examiner* — James C Kerveros
(74) *Attorney, Agent, or Firm* — Seed IP Law Group PLLC (57) ABSTRACT

A method for monitoring the execution of a sequence of instruction codes in an integrated circuit comprising a central processing unit provided for executing such instruction codes. Current cumulative signatures are produced using deterministic address, control or data logic signals involved in the execution of the sequence and taken off at various points of the integrated circuit. A final cumulative signature is compared with an expected signature and an error signal is produced if the two signatures are not identical. Particularly useful to secure integrated circuits for smart cards.

28 Claims, 4 Drawing Sheets

U.S. PATENT DOCUMENTS

| | | | |
|---|---|---|---|
| 6,128,755 A | 10/2000 | Bello et al. | 714/715 |
| 6,158,033 A | 12/2000 | Wagner et al. | 714/726 |
| 6,209,109 B1 | 3/2001 | Hori et al. | 714/707 |
| 6,249,893 B1 | 6/2001 | Rajsuman et al. | 714/741 |
| 6,279,128 B1 | 8/2001 | Arnold et al. | 714/49 |
| 6,282,134 B1 | 8/2001 | Kumar | 365/201 |
| 6,357,024 B1 | 3/2002 | Dutton et al. | 714/45 |
| 6,421,790 B1 | 7/2002 | Fruehling et al. | 714/30 |
| 6,457,145 B1 | 9/2002 | Holmberg et al. | 714/45 |
| 6,557,132 B2 | 4/2003 | Gangl et al. | 714/736 |
| 6,571,363 B1 | 5/2003 | Steiss | 714/732 |
| 6,587,975 B2 | 7/2003 | Mori et al. | 714/423 |
| 6,625,688 B1 | 9/2003 | Fruehling et al. | 711/109 |
| 6,629,279 B1 | 9/2003 | Narayan et al. | 714/732 |
| 6,671,839 B1 | 12/2003 | Côté et al. | 714/726 |
| 6,684,357 B2 | 1/2004 | Im | 714/732 |
| 6,694,451 B2 | 2/2004 | Atkinson | 714/15 |
| 6,751,749 B2 | 6/2004 | Hofstee et al. | 714/11 |
| 6,772,368 B2 | 8/2004 | Dhong et al. | 714/11 |
| 6,873,330 B2 | 3/2005 | Burk et al. | 345/503 |
| 6,904,150 B1 | 6/2005 | Dent | 380/28 |
| 6,981,176 B2 | 12/2005 | Fruehling et al. | 714/11 |
| 6,988,232 B2 | 1/2006 | Ricchetti et al. | 714/736 |
| 6,990,621 B2 | 1/2006 | Maneparambil et al. | 714/742 |
| 7,058,870 B2 * | 6/2006 | Cheung et al. | 714/732 |
| 7,114,110 B2 | 9/2006 | Kikuchi et al. | 714/736 |
| 7,131,046 B2 * | 10/2006 | Volkerink et al. | 714/732 |
| 7,152,193 B2 | 12/2006 | Watkins et al. | 714/724 |
| 7,178,039 B2 * | 2/2007 | Mueller | 713/193 |
| 7,278,048 B2 | 10/2007 | Clark et al. | 714/1 |
| 7,322,042 B2 | 1/2008 | Srinivasan et al. | 726/17 |
| 7,380,275 B2 | 5/2008 | Srinivasan et al. | 726/17 |
| 7,436,957 B1 * | 10/2008 | Fischer et al. | 380/53 |
| 7,461,312 B2 | 12/2008 | Tardif et al. | 714/732 |
| 7,584,386 B2 | 9/2009 | Bancel et al. | 714/45 |
| 2005/0177603 A1 | 8/2005 | Shavit | 707/204 |

FOREIGN PATENT DOCUMENTS

EP    1 376 367 A2    1/2004

* cited by examiner

MICROPROCESSOR COMPRISING SIGNATURE MEANS FOR DETECTING AN ATTACK BY ERROR INJECTION

CROSS-REFERENCES TO RELATED APPLICATIONS

This application is a continuation of U.S. patent application Ser. No. 11/111,018, filed Apr. 21, 2005, now U.S. Pat. No. 7,904,775, and claims the benefit under 35 U.S.C. §119 (a) of priority to French Application Nos. 0404183 and 0404184, both filed Apr. 21, 2004.

BACKGROUND OF THE INVENTION

1. Field of the Invention

The present disclosure relates to a system, method and article for protecting microprocessor integrated circuits against attacks by error injection.

2. Description of the Related Art

In recent years, the techniques of hacking secured microprocessor integrated circuits (i.e., microprocessors, microcontrollers, microprocessor memories . . . ) have developed considerably. The most advanced hacking methods currently involve injecting errors at determined points of an integrated circuit during the execution of so-called sensitive operations, such as authentication operations or operations of executing a cryptography algorithm for example. Such attacks by error injection, also referred to as attacks by fault injection, can enable, in combination with mathematical models, the structure of a cryptography algorithm and/or the secret keys it uses to be deduced. The fault injection can be done in various ways, by introducing glitches into the supply voltage of the integrated circuit, by introducing glitches into the clock signal of the integrated circuit, by exposing the integrated circuit to radiations, etc.

Thus, the detection of error injections is considered to be a measure to provide a high level of security to certain integrated circuits, particularly integrated circuits for smart cards.

A method for monitoring the execution of a program is disclosed in EP 1,161,725, which involves producing cumulative signatures that vary according to the instruction codes that run in the instruction register of a microprocessor. Such a method enables a derailment of the program being executed, particularly due to an error injection, to be detected. However, one type of attack against which a microprocessor integrated circuit must be protected is the injection of error into the data supplied to a peripheral element, particularly a cryptographic calculation block (which is generally integrated onto the same silicon microchip as the microprocessor). Now, monitoring the proper execution of a sequence of instruction codes does not enable such an attack to be detected, since the program is executed normally as far as the value and the succession of the instruction codes in the instruction register are concerned. Thus, this monitoring method does not enable an injection of errors into the data paths or even into control signals of the microprocessor to be detected.

BRIEF SUMMARY OF THE INVENTION

In one aspect, a method for monitoring the execution of a sequence of instruction codes in an integrated circuit comprising a central processing unit provided for executing such instruction codes, and an integrated circuit, comprises monitoring the execution of at least one sequence of instruction codes comprising at least one instruction code.

The present disclosure is based on the observation according to which the execution of instruction codes by the central processing unit (CPU) of a microprocessor integrated circuit uses various signals which are sometimes deterministic, i.e., predictable, and sometimes non-deterministic. As the structure of the microprocessor is known by manufacturers and generally by professional users, it is possible to draw up a list, for each instruction code executed, of the signals that are of the deterministic type out of all of the address, control or data signals involved in the execution of the instruction code, and to produce signatures using such signals. For example, operand-type data read in a read-only memory like a ROM memory, or in write-protected areas of an electrically erasable and programmable memory, are deterministic data. Addresses circulating on an address bus during the execution of instruction codes are also deterministic, particularly the addresses for reading the instruction codes themselves ("fetch" cycles), and addresses of operands. Certain control signals appearing in the microprocessor during the execution of the instruction codes are also deterministic, for example read/write signals, signals for selecting memories or registers, and signals indicating that the central processing unit is performing a determined operation.

Thus, one aspect of the present disclosure is to monitor the execution of a sequence of instruction codes comprising at least one instruction code by producing cumulative signatures using a plurality of deterministic signals involved in the execution of the instruction code or instruction codes, and to compare a final signature obtained with an expected signature. Such an expected signature can be determined by the programmer since it is based on deterministic signals and on chains of deterministic operations.

An error signal having an active value is sent when an anomaly is detected. "Active value" means the fact that the error signal, when it has this value, triggers operations required to protect the integrated circuit, for example the application of a reset signal to the central processing unit, or the supply of an interrupt signal which causes the central processing unit to switch into a determined sub-program, the destruction of sensitive data present in a memory, etc.

According to the classical monitoring methods, an error signal is generated when the program reaches a final instruction for checking the signature, which closes the execution of the sequence of instruction codes being monitored. Now, if a derailment of the program occurs further to an error injection, the final instruction for checking the signature is not executed and the error signal is not sent.

Another aspect of the present disclosure is to supply an error signal having the active value by default and being capable of being inhibited if a final signature obtained after executing a sequence of instruction codes is equal to an expected signature. Such an error signal is masked during the execution of the operations to be monitored, and the masking is lifted unconditionally or automatically after a lapse of time corresponding substantially to the execution time of the operations to be monitored has elapsed. If, at the moment at which the masking is lifted, the error signal has not been inhibited by the appearance of a valid signature, said signal becomes active in the integrated circuit since it is no longer masked.

Thus, according to one aspect, the present invention provides a method for monitoring the execution of a sequence of instruction codes in an integrated circuit comprising a central processing unit provided for executing such instruction codes, comprising the steps of: during the execution of the sequence, taking off at various points of the integrated circuit, deterministic address, control or data logic signals involved in the execution of the sequence, and producing current cumulative signatures using the deterministic logic signals and in synchronization with a clock signal, each current cumulative signature varying according to the previous cumulative signature and to the deterministic logic signals, until, at the end of the execution of the sequence, a final cumulative signature is obtained, and comparing the final cumulative signature with an expected signature.

According to one embodiment, the clock signal which paces the production of the current cumulative signatures is the clock signal of the central processing unit, and a current cumulative signature is produced at each clock cycle of the central processing unit, during the execution of the sequence.

According to one embodiment, the deterministic address, control or data logic signals according to which the current cumulative signatures are produced comprise all or part of the following signals: addresses applied to peripheral elements of the central processing unit, signals for controlling the peripheral elements, signals indicative of operations in progress, data forming operands or instruction codes, and a signal is excluded from the calculation of a cumulative signature if it is not deterministic during the clock cycle during which the signature is produced.

According to one embodiment, the current cumulative signatures are produced by means of a hard-wired logic signature calculation circuit comprising parallel inputs linked to points of the integrated circuit through which deterministic and non-deterministic logic signals pass, and inputs of the signature calculation circuit are inhibited when the logic signals are not deterministic.

According to one embodiment, inputs of the signature calculation circuit are inhibited by means of a configurable hard-wired logic masking circuit.

According to one embodiment, the inputs of the signature calculation circuit are connected to a data bus, to an address bus, and to a control bus conveying signals for controlling peripheral elements of the central processing unit.

According to one embodiment, the calculation of the cumulative signatures is performed by means of a linear feedback shift register.

According to one embodiment, the method comprises the steps of: during the execution of the sequence, producing an error signal having an active value by default while the current cumulative signature is different from an expected signature, masking the error signal for a predetermined time interval corresponding substantially to the presumed duration of execution of the sequence, and unconditionally lifting the masking of the error signal when the predetermined time interval expires.

According to one embodiment, the method comprises steps of designing a program that comprises the sequence of instruction codes, the design steps comprising inserting, into the program, instructions for selecting the deterministic signals using which the current signatures are produced during the execution of the sequence.

In another aspect, an integrated circuit comprising a central processing unit for executing a program comprising instruction codes, and means for monitoring the execution of at least one sequence of instruction codes comprising at least one instruction code, the monitoring means comprising: a signature calculation circuit comprising parallel inputs linked to various points of the integrated circuit through which deterministic address, control or data logic signals involved in the execution of the sequence pass, the signature calculation circuit being arranged for producing current cumulative signatures that vary according to the deterministic signals, until a final cumulative signature is obtained at the end of the execution of the sequence, a configurable hard-wired logic masking circuit, for inhibiting the inputs of the signature calculation circuit which are capable of receiving non-deterministic signals during the execution of the sequence, and means for comparing the final cumulative signature with an expected signature.

According to one embodiment, the configurable hard-wired logic masking circuit comprises a register at least write-accessible for receiving a string of bits forming a binary mask.

According to one embodiment, the signature calculation circuit comprises inputs linked to points of the integrated circuit through which all or part of the following signals pass: addresses applied to peripheral elements of the central processing unit, signals for controlling the peripheral elements, signals indicative of operations in progress, data forming operands or instruction codes.

According to one embodiment, the signature calculation circuit comprises inputs linked to a data bus, inputs linked to an address bus, and inputs linked to a control bus on which signals for controlling peripheral elements of the central processing unit pass.

According to one embodiment, the means for producing an error signal comprise: a timer for measuring a predetermined time interval, means for producing an error signal having an active value by default while the current cumulative signature is different from the expected signature, and means for masking the error signal during the measurement of the time interval by the timer, and unconditionally lifting the mask of the error signal when the time interval expires.

According to one embodiment, the integrated circuit comprises a comparator the output of which supplies the error signal, receiving the current cumulative signature at one input and the expected signature at another input, a memory means such as a flip-flop for supplying the error signal, arranged for deactivating the error signal when the output of the comparator indicates an equality of signatures, and a logic circuit for masking the error signal, receiving the error signal at one input and a signal supplied by the timer at another input, the masking logic circuit being transparent or non-transparent in relation to the error signal according to the value of the signal sent by the timer.

According to one embodiment, the signature calculation circuit is paced by a clock signal of the central processing unit, and calculates a current cumulative signature at each clock cycle, by replacing each previous signature with a new signature, in a register for storing the current signature.

In one aspect, a method for monitoring execution of a sequence of instruction codes in an integrated circuit having a central processing unit provided for executing such instruction codes comprises: during the execution of the sequence, taking off at various points of the integrated circuit, at least one of deterministic address, control and data logic signals involved in the execution of the sequence, and producing current cumulative signatures using the deterministic logic signals and in synchronization with a clock signal, each current cumulative signature varying according to a previous cumulative signature and to the deterministic logic signals, until, at an end of the execution of the sequence, a final cumulative signature is obtained; and comparing the final cumulative signature with an expected signature.

In another aspect, an integrated circuit comprises: a central processing unit for executing a program comprising instruction codes; and means for monitoring execution of at least one sequence of instruction codes comprising at least one instruction code, the monitoring means comprising: a signature calculation circuit comprising parallel inputs linked to various points of the integrated circuit through which at least one of deterministic address, control or data logic signals involved in the execution of the sequence pass, the signature calculation circuit being arranged for producing current cumulative signatures that vary according to the deterministic signals, until a final cumulative signature is obtained at an end of the execution of the sequence; a configurable hard-wired logic masking circuit for inhibiting the inputs of the signature calculation circuit which are capable of receiving non-deterministic signals during the execution of the sequence; and means for comparing the final cumulative signature with an expected signature.

In another aspect, a computer-readable memory medium contains a sequence of instructions for controlling an integrated circuit, the sequence including instructions for causing the integrated circuit to select deterministic signals for use in producing a current cumulative signature during execution of the sequence of instructions.

In another aspect, an integrated circuit comprises: a processor for executing a sequence of instruction codes; a signature production module configured to monitor deterministic signals in the integrated circuit during execution of the sequence of instruction codes and to produce a current cumulative signature based on the monitored deterministic signals; and an error detection module coupled to the signature production module and configured to produce an error signal based on a comparison of the current cumulative signature with an expected final cumulative signature.

In another aspect, a method of monitoring execution of a sequence of instruction codes by an integrated circuit comprises: executing the sequence of instruction codes; monitoring deterministic signals in the integrated circuit during execution of the sequence of instruction codes; producing a current cumulative signature based on the monitored deterministic signals; and comparing the current cumulative signature with an expected final cumulative signature.

BRIEF DESCRIPTION OF THE SEVERAL VIEWS OF THE DRAWINGS

These and other objects, features and advantages of embodiments of the present invention will be explained in greater detail in the following description of example embodiments according to the present invention, given in relation with, but not limited to the following figures.

DETAILED DESCRIPTION OF THE INVENTION

Figure 1:
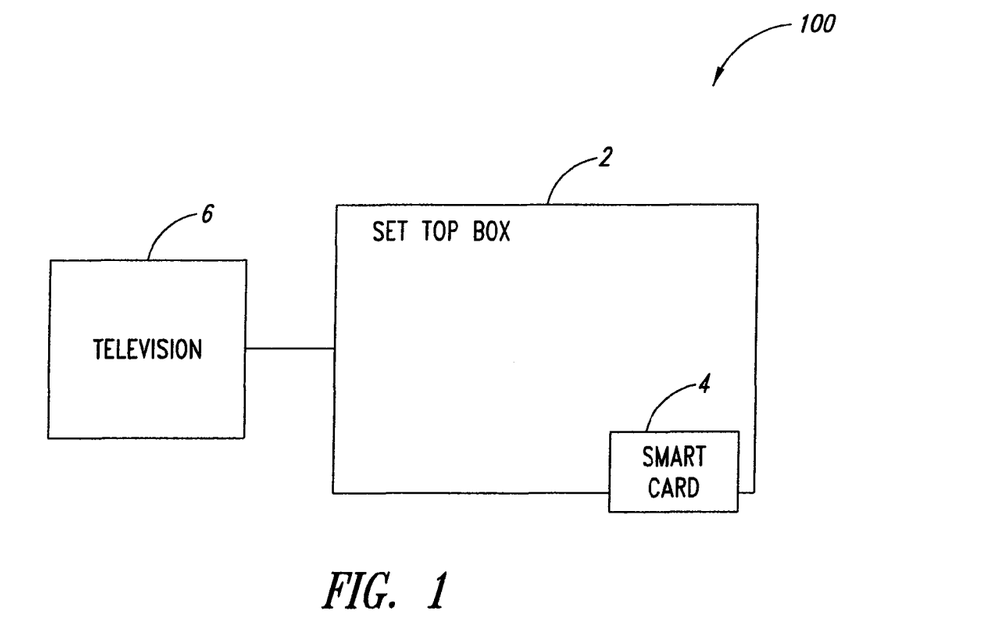
FIG. 1 is a functional block diagram of a system according to an embodiment of the present invention.
Figure 2:
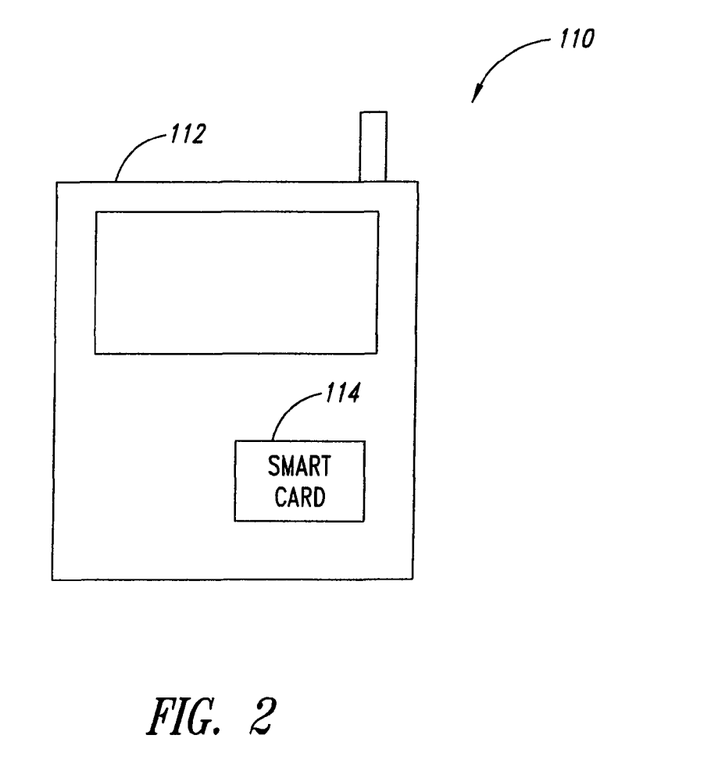
FIG. 2 is a functional block diagram of a cell-phone according to an embodiment of the present invention.

FIG. 1 is a functional block diagram of a system 100 comprising a set-top box 2, a smart card 4 and a device 6, which as illustrated is a television set. FIG. 2 is a functional block diagram of a system 110 comprising a cell phone 112 and a smart card 114.

Figure 3:
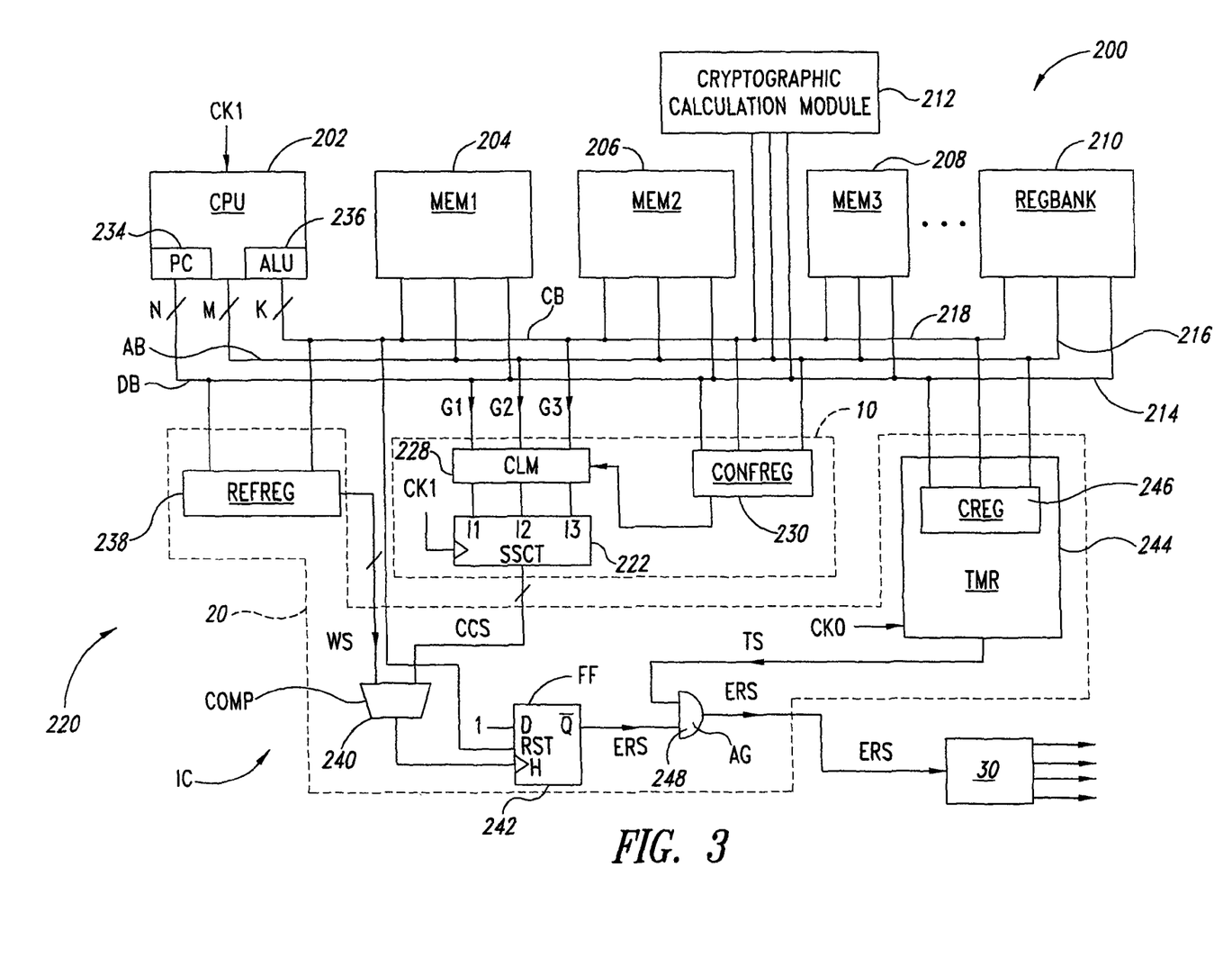
FIG. 3 is a functional block diagram of an integrated circuit embodying the present invention.

FIG. 3 represents the architecture of an integrated circuit IC 200 suitable for use in the system 100 of FIG. 1 or the system 110 of FIG. 2. For example, the integrated circuit 200 may be part of the set-top box 2 or smart card 4 of FIG. 1, or part of the cell phone 112 or smart card 114 of FIG. 2. A system, such as the system 100 of FIG. 1 or the system 110 of FIG. 2, may contain more than one integrated circuit embodying the invention, such as the integrated circuit 200 illustrated in FIG. 3. The IC 200 is of the microprocessor or microcontroller type, equipped with a monitoring device 220. The monitoring device 220 enables the operation of the integrated circuit 200 to be monitored during the execution of a sequence of instruction codes so as to detect an error injection in particular.

The integrated circuit IC 200 comprises a CPU 202 (central processing unit) and peripheral elements of the CPU 202, here memories MEM1 204, MEM2 206, MEM3 208 and a register bank REGBANK 210. Other peripheral elements can be provided, particularly a cryptographic calculation module 212. The memory MEM1 204 is for example a non-volatile memory of ROM type (read-only memory), the memory MEM2 206 an electrically erasable and programmable memory of EEPROM type, and the memory MEM3 208 a volatile memory of RAM type. The memory MEM1 204 contains for example master programs (programs developed by the manufacturer: test, security management and authentication programs . . . ) and operands. The memory MEM2 206 comprises for example application programs (programs developed by the user) and operands. These various programs consist of instruction codes executable by the CPU 202. The memory MEM3 208 generally contains application data, which are erased when the integrated circuit 200 is switched off. Finally the register bank REGBANK 210 can contain volatile data such as variables, results of calculations, flags, etc.

These various peripheral elements are here linked to the CPU 202 by a data bus DB 214 of N bits, an address bus AB 216 of M bits and a control bus CB 218 of K bits. "Control bus" means a set of wires conveying selection or information signals sent by the CPU 202 to the peripheral elements, or vice-versa. The bus CB 218 particularly conveys signals SEL1, SEL2, SEL3 for selecting the memories MEM1 204, MEM2 206, MEM3 208, a signal SEL4 for selecting the register bank REGBANK 210, a read or write signal R/W, and a signal FETCH sent by the CPU 202 during the reading of a instruction code in one of the program memories MEM1 204, MEM2 206.

The monitoring device 220 comprises a signature production circuit or block 10 and an error detection circuit or block 20, marked out by dotted lines in FIG. 3. The signature production block 10 is independent from the error detection block 20. Thus, as it will be understood in the light of the following description, the signature production block 10 can be combined with an error detection block other than the error detection block 20 represented, and vice-versa.

Figure 4:
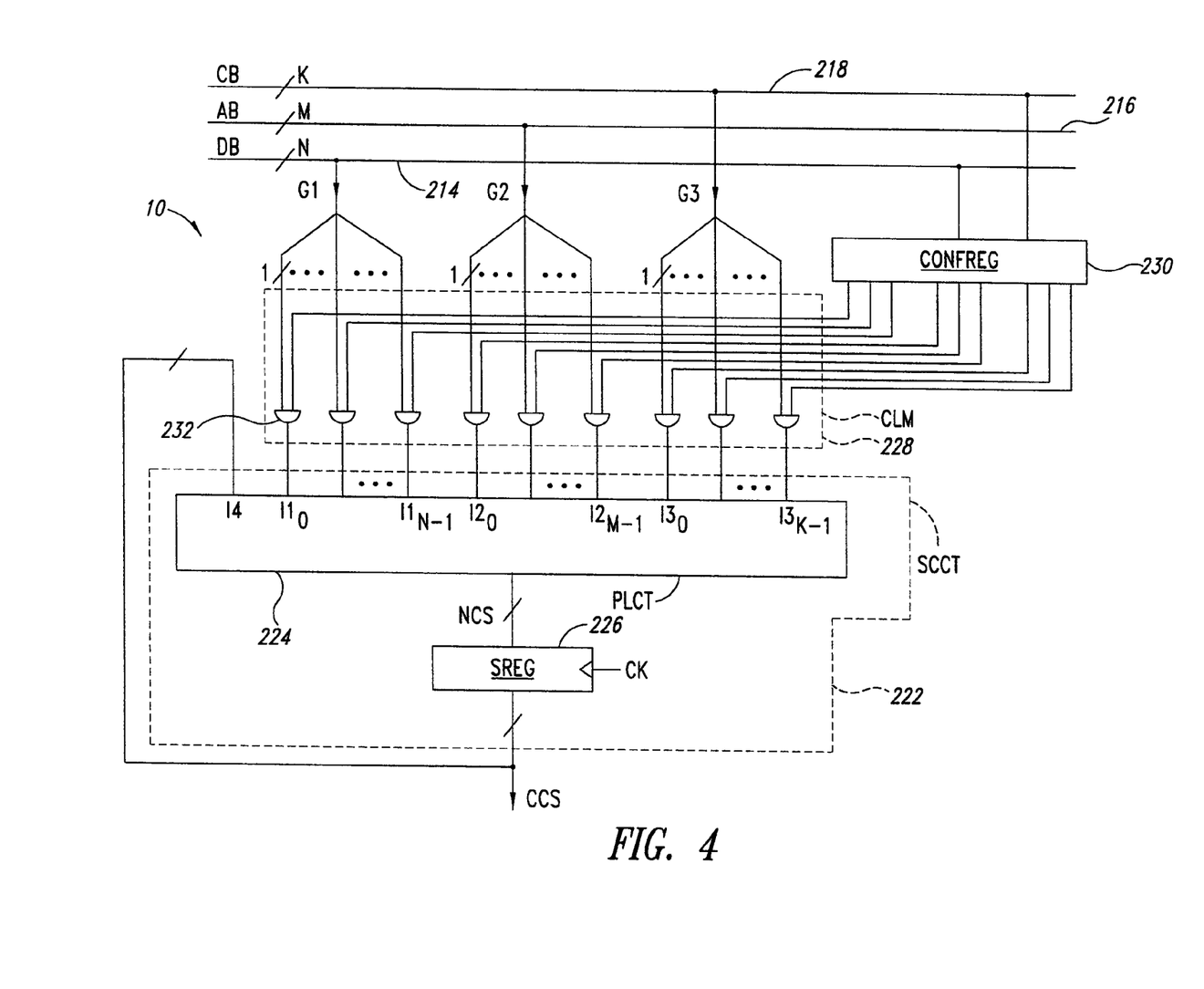
FIG. 4 is a detailed view of an embodiment of a signature production circuit suitable for use in the embodiment illustrated in FIG. 3.

The signature production module or block 10 comprises a hard-wired logic signature calculation module or circuit SCCT 222. The circuit SCCT 222 comprises parallel inputs I1, I2, I3 and is paced by a clock signal CK1 which in one embodiment is the clock signal of the CPU 202. The circuit SCCT 222 is for example a register, such as an LSFR (Linear Feedback Shift Register). As represented in greater detail in FIG. 4, one embodiment of an SCCT 222 comprises a logic circuit PLCT 224 and a signature register SREG 226 with parallel-type input and output. The circuit PLCT 224 executes a signature function Fs and comprises inputs I1, I2, I3 forming the inputs of the circuit SCCT 222, as well as an input I4 receiving a current cumulative signature CCS. The output of the circuit PLCT 224 supplies to the input of the register SREG 226 a next cumulative signature NCS which varies according to the current cumulative signature CCS and to the inputs I1, I2, I3, i.e.:

$$NCS=Fs(CCS, I1, I2, I3) \quad (1)$$

Upon each new clock cycle CK1, the register SREG 226 copies the signature present at its input on its output, such that the next signature supplied by the circuit PLCT 224 during the previous clock cycle becomes the current signature, and the current signature of the previous clock cycle becomes the previous signature PCS, i.e.:

$$CCS=Fs(PCS, I1, I2, I3) \quad (2)$$

the relation (2) being equivalent to the relation (1) seen from the output of the register SREG 226.

The inputs I1, I2, I3 of the circuit SCCT 222 are linked to various points of the integrated circuit 200 through which address, control or data signals pass, which are involved in the execution of the instruction codes present in the memories MEM1 204, MEM2 206, and receive groups G1, G2, G3 of signature-generating signals. Here, the input I1 is linked to the data bus DB 214, the input I2 is linked to the address bus AB 216, and the input I3 is linked to the control bus CB 218. Thus, the group of signals G1 comprises N data bits $d_0$, $d_1 \ldots d_{N-1}$ taken off at the data bus 214, which are applied to N elementary inputs $I1_0, I1_1, \ldots I1_{N-1}$ forming the input I1. The group of signals G2 comprises N address bits $a_0, a_1 \ldots a_{M-1}$ taken off at the address bus 216 and applied to N elementary inputs $I2_0, I2_1, \ldots I2_{M-1}$ forming the input I2. The group of signals G3 comprises K control signals $c_0, c_1 \ldots c_{K-1}$ taken off at the control bus 218 and applied to N elementary inputs $I3_0, I3_1, \ldots I3_{K-1}$ forming the input I3.

The signals which pass through such points of the integrated circuit 200 can sometimes be deterministic and sometimes non-deterministic (non-predictable) according to the operation that the CPU 202 is executing. A signal is deterministic when its value is known by the programmer as well as the instant at which this signal appears during the execution of the program. For example, the execution of an instruction for reading an operand in the read-only memory MEM1 204 is an operation that may be deterministic in all of its aspects, i.e., as far as the following are concerned:

the value of the operand that is read in the memory, such that the signals appearing on the data bus 214 (bits of the operand), forming the group G1, are deterministic, the address for reading the operand, such that all of the signals in the group G2 appearing on the address bus 216 are also deterministic, and the signal for selecting the memory MEM1 204 and the read signal R/W appearing on the control bus 218, such that all of the signals in the group G3 are deterministic (the other control signals being assumed to be inactive, thus also having a determined logic value).

Similarly, the execution of an operation of reading (FETCH) an instruction code may be deterministic in all of its aspects, both as far as the instruction code (data bus 214, group G1) and the address for reading the instruction code (address bus 216, group G2) are concerned as well as the control signals (signal FETCH, signal for selecting the memory MEM1 204 and MEM2 206, read signal R/W, group G3).

These signals can also not be deterministic, in whole or in part. For example, a variable calculated according to a non-predictable datum or event is a variable that is itself non-predictable. However, the reading of such a variable in a memory, for example in the memory MEM3 208 (RAM memory) or in the register bank 210, although it is not deterministic as far as the value of the variable itself is concerned, can be predictable as far as the address for reading the variable is concerned if this address has been determined by the programmer and is therefore fixed by the program, and does not itself depend on the result of a calculation using a non-predictable parameter or datum. In this case, the signals taken off at the data bus 214, i.e., the signals forming the group G1, are not deterministic, while the address signals forming the group G2 and the control signals forming the group G3 are.

The inputs I1, I2, I3 of the signature calculation circuit SSCT 222 are linked to the buses DB 214, AB 216, CB 218 through a configurable hard-wired logic masking circuit CLM 228 which is configured by a register CONFREG 230. The register CONFREG 230 is at least write-accessible, preferably read/write-accessible, through the data bus DB 214, and is linked to the control bus 218 for its read and/or write selection.

The register CONFREG 230 receives a string of bits forming a binary mask, here consisting of three distinct concatenated binary masks M1, M2, M3. The mask M1 is provided for masking all or part of the elementary inputs of the input I1 and comprises N bits $m1_0, m1_1 \ldots m1_{N-1}$. The mask M2 is provided for masking all or part of the elementary inputs of the input I2 and comprises M bits $m2_0, m2_1 \ldots m2_{M-1}$. The mask M3 is provided for masking all or part of the elementary inputs of the input I3 and comprises K bits $m3_0, m3_1 \ldots m3_{K-1}$. Each mask bit is thus associated with one of the signature-generating signals $d_0$ to $d_{N-1}$, $a_0$ to $a_{M-1}$, $c_0$ to $c_{K-1}$, respectively, which it enables to be masked or not.

Thus, out of the N+M+K inputs of the circuit SCCT 222, the register CONFREG 230 enables those inputs that receive signature-generating signals that are not deterministic, during a sequence of producing signatures, to be inhibited. The masking is materially performed in the circuit CLM 228 illustrated in FIG. 4 by means of a plurality of AND gates 232 each receiving at one input one of the signals $d_0$ to $d_{N-1}$, $a_0$ to $a_{M-1}$, $c_0$ to $c_{K-1}$ and at another input the corresponding mask bit $m1_0$ to $m1_{N-1}$, $m2_0$ to $2_{M-1}$, $m3_0$ to $m3_{K-1}$, the output of each AND gate 232 being applied to the corresponding elementary input $I1_0$ to $I1_{N-1}$, $I2_0$ to $I2_{M-1}$, $I3_0$ to $I3_{K-1}$ of the circuit SCCT 222. Thus, the relation (2) above can be written as follows:

$$CCS=Fs(PCS, G1*M1, G2*M2, G3*M3) \quad (3)$$

"*" here being the AND function applied bit by bit.

Here, a bit on 0 in the binary mask inhibits the signature-generating signal of corresponding rank by forcing its value to 0. However, any other combinatory inhibition function can be used, such as the OR, NOR, NAND function, etc. for example. Switches driven by the bits of the binary mask can also be used as inhibiting means.

An example of use of the signature production block 10 during the execution of a program by the CPU 202 will now be described. At the time the program is developed, the program parts corresponding to the execution of sensitive operations, i.e., operations requiring a high level of security, are divided into deterministic sequences. Each deterministic sequence comprises at least one instruction code or a predictable series of instruction codes. As a counter example, one program part comprising a conditional jump instruction that varies according to a non-predictable datum is not a deterministic sequence. Such a sequence must therefore be divided into deterministic sequences of smaller size. Furthermore, the execution of each deterministic sequence uses address, control or data signals some of which are deterministic and others of which are not, as explained above. Thus, the deterministic nature of a sequence, on which for example the method described by EP 1,161,725 is based, must not be confused with the deterministic nature of the signals involved in the execution of the deterministic sequence, on which the present disclosure is based.

For a better understanding, an example of a secured sequence will be considered, such sequence comprising an instruction for reading an operand at an address AD1 in the memory MEM1 204, and an instruction for writing the operand in a register of address AD2 present in the register bank 210. This sequence, which is stored in the memory MEM1 204, comprises for example the following instruction codes:

```
[READ MEM1][AD1]
[WRITE REGBANK][AD2]
```

So as to secure the execution of this sequence, before the sequence itself, an instruction for loading the masks M1, M2, M3 into the register CONFREG 230 and an instruction for resetting the signature register SREG 226 are inserted into the program (it is assumed here that the circuit SCCT 222 is permanently active and does not need to be activated by a special command for producing signatures). The sequence modified by the insertion of these instructions is thus as follows (the terms used between the signs "<" and ">" being comments):

```
<loading the masks M1, M2, M3 into the register CONFREG>
[LOAD CONFREG][M1, M2, M3]
<resetting the register SREG>
[RESET SREG]
<secured sequence >
[READ MEM1][AD1] <instruction code 1>
[WRITE REGBANK][AD2] <instruction code 2>
```

Here, the binary mask loaded into the register CONFREG 230 only comprises bits on 1 since the sequence to be executed only comprises deterministic signals, whether it be for the address for reading or writing the operand, the value of the operand (operand known since it is present in the ROM memory) or the control signals. Furthermore, the effect of the resetting of the register SREG 226 is to put an initial signature thereinto which forms the basis value for the calculation of the cumulative signatures. This initial value can also be chosen to be non-zero, provided that it is known by the programmer so that he can determine the signature expected at the end of the execution of the sequence, as will be described below.

After the clock cycle following the one during which the signature register SREG 226 is reset, the signature calculation circuit SCCT 222 starts to produce cumulative signatures at each clock cycle by taking into account all of the deterministic signals taken off in the integrated circuit 200. Table 1 below schematically describes the process of producing the current cumulative signatures CS1, CS2, CS3 . . . at each clock cycle of the CPU 202. It is assumed here that each instruction is read in two clock cycles of the CPU 202 ("fetch" cycles) and is executed in two clock cycles. Thus the following cycles are distinguished:

Cycle 1: addressing the memory MEM1 ("fetch" cycle),
Cycle 2: reading the instruction code 1 ("fetch" cycle),
Cycle 3: addressing the memory MEM1 at the address AD1,
Cycle 4: reading the operand in the memory MEM1 and loading the operand into the ALU of the CPU,
Cycle 5: addressing the memory MEM1 ("fetch" cycle),
Cycle 6: reading the instruction code 2 ("fetch" cycle),
Cycle 7: reading the ALU and putting the operand on the data bus, addressing and selecting the register of address AD2 in the register bank REGBANK,
Cycle 8: saving the operand in the register.

In Table 1, only the signature-generating signals having a value different to their default value (inactive value) are represented. The addresses AD_code1 and AD_code2 are the addresses for reading the two instruction codes of the secured sequence, supplied by a program counter PC 234 of the central processing unit. The signal R/W is here on 1 for triggering a read operation and on 0 for a write operation. The values rated "xxx" are default values of the data or address bus when a datum or a code does not pass on the bus. Such default values are deterministic and are involved in the calculation of the current signature during the clock cycle in question. Finally, the control signals IN_ALU and OUT_ALU indicate that the CPU 202 is performing an internal operation of loading or respectively reading an operand in its arithmetic and logic unit ALU 236. Such control signals are not present on the control bus 218 and are not therefore taken into account in the signature calculation. However, these signals, as well as other internal signals of the CPU 202, could also be "externalized" like the signal FETCH, so as to be taken into account in the signature calculation.

TABLE 1

| | Address bus | Data bus | Control bus | Cycle | Signatures |
|---|---|---|---|---|---|
| Reading of the code 1 | AD_code1 | [xxx] | SEL1 = 1-FETCH = 1 | 1 | CCS1 |
| | AD_code1 | code 1 | SEL1 = 1-FETCH = 1 R/W = 1 | 2 | CCS2 |
| Execution of the code 1 | AD1 | [xxx] | SEL1 = 1 | 3 | CCS3 |
| | AD1 | operand | SEL1 = 1-R/W = 1 IN_ALU | 4 | CCS4 |
| Reading of the code 2 | AD_code2 | [xxx] | SEL1 = 1-FETCH = 1 | 5 | CCS5 |
| | AD_code2 | code 2 | SEL1 = 1-FETCH = 1 R/W = 1 | 6 | CCS6 |
| Execution of the code 2 | AD2 | operand | SEL4 = 1-OUT_ALU | 7 | CCS7 |
| | AD2 | operand | SEL4 = 1-R/W = 0 | 8 | CCS8 |

Thus, a cumulative signature is produced at each clock cycle. When the sequence is executed, the final cumulative signature obtained is the signature CCS8. This signature is predictable and is thus taken to be equal to an expected signature WS determined by the programmer when the program is designed, preferably by means of a signature calculation software tool. The final signature is compared with the expected signature by the error detection block 20 which will now be described.

It will be assumed now that the address AD2 for loading the operand into the register bank depends on the result of a non-deterministic operation performed by a program part that precedes the secured sequence. The sequence thus becomes semi-deterministic.

In this case, the signals on the address bus 216 are not taken into account during the cycles 1 to 8 for the calculation of the cumulative signatures, since the address AD2 that is applied to the address bus during the cycles 7 and 8 is not predictable. The values of the binary masks are thus M1=1, M2=0 (freezing of the address bits) and M3=1 for the entire secured sequence.

The semi-deterministic sequence can also be split into two individually secured sub-sequences, one being entirely deterministic and formed by the cycles 1 to 4 (execution of the first instruction code), the other being semi-deterministic and formed by the cycles 5 to 8 (execution of the second instruction code). A first final cumulative signature, calculated during the cycles 1 to 4 by taking all of the mask bits to 1, is produced at the end of the cycle 4 and is compared to a first expected signature. A second final cumulative signature, calculated during the cycles 5 to 8 by taking the binary mask M2 to 0 and the masks M1, M3 to 1, is produced at the end of the cycle 8 and is compared to a second expected signature.

After reviewing the specification, it will be understood by those skilled in the art that various alternatives and embodiments are possible, particularly as far as the extent, the nature and the number of signature-generating signals taken into account to produce the cumulative signatures are concerned. Furthermore, although above it was indicated that a current cumulative signature is produced at each clock cycle of the CPU 202, embodiments of the method of the present invention can also comprise steps of producing signatures that are paced by a clock signal that is slower or faster than the clock signal of the CPU 202, for example the production of one signature every two or three clock cycles of the CPU 202. However, it is advantageous in terms of security not to jump clock cycles of the CPU 202 in the calculation of the cumulative signatures.

Like the signature production block 10 that has just been described, the error detection block 20 as represented in FIG. 3 is a logic block that is autonomous in relation to the CPU 202 except as far as its initialization and its activation are concerned. As illustrated, the signature production block 10 and the error detection block 20 are hard-wired circuits.

The error detection block 20 comprises a register REFREG 238, a comparator COMP 240, a synchronous flip-flop FF 242 (or D flip-flop) and a timer TMR 244.

The register REFREG 238 is read-accessible, preferably read/write-accessible, via the data bus DB 214, and is selected by means of a wire of the control bus CB 218. It is provided for receiving the expected signature WS calculated by the programmer.

The timer TMR 244 is a count-down counter equipped with a counting register CREG 246 that is write-accessible, and preferably read/write-accessible, via the data bus DB 214. The timer 244 is paced by a clock signal CK0, such as a primary clock signal of the integrated circuit 200 for example, using which the clock signal CK1 is produced. The timer 244 is linked to the control busCB 218 for read/write-selecting the register CREG 246 and for activating the timer 244. After loading a counting set-point CVAL into the register CREG 246 and activating the timer 244, the timer 244 decrements the register GREG 246 and supplies an output signal TS which is on 0. This signal changes to 1 when the value of the register CREG 246 reaches zero. The time interval measured is thus equal to CVAL.T, T being the period of the clock signal CK0.

The comparator COMP 240 has a first input linked to the output of the register REFREG 238, which receives the expected signature WS, and a second input linked to the output of the register SREG 226 of the signature production block 10, which receives the current cumulative signature CCS. The output of the comparator COMP 240 is on 0 while the current signature is different to the expected signature, and changes to 1 when the signatures are equal.

The flip-flop FF 242 comprises an input D, a synchronization input H, an inverted output Q-not which supplies an error signal ERS, and a reset input RST. The input D permanently receives the logic value 1 and the input H is connected to the output of the comparator COMP 240. The output Q-not copies the input D by inverting its value when a rising edge appears on the input H. The input RST is linked to a wire of the control bus CB 218 so that the reset of the flip-flop FF 242 automatically occurs when an expected signature WS is loaded into the register REFREG 238.

Thus, when an expected signature WS is loaded into the register REFREG 238, the flip-flop FF 242 is reset and the error signal ERS on the output Q-not changes to 1 while the output of the comparator COMP 240 is on 0. When a current signature CCS is equal to the expected signature WS and the output of the comparator COMP 240 changes to 1, the input H sees a rising edge which triggers the flip-flop 242. The output Q-not copies the input D by inverting its value, such that the error signal ERS changes to 0.

By convention, the value "1" of the error signal is an active value which causes a stop or a reset of the CPU 202 or any other emergency measure known by those skilled in the art. Thus, the error signal is by default on the active value and is only inhibited (change to 0) if a current signature coincides, at a given instant, with the expected signature WS. The active value of the error signal could be a "0" and the inhibited value a "1".

The error signal ERS is applied to an error management circuit or module 30 through a logic gate AG 248, of AND type as illustrated, which forms a mask of the error signal. The gate AG 248 receives the error signal ERS at one input and the timer signal TS at another input, and its output is applied by means of the error management circuit 30.

The circuit 30 may be, for example, an interrupt decoder supplying an interrupt signal, a circuit for resetting the integrated circuit, a device that automatically erases confidential data present in the EEPROM memory (MEM2 206), etc.

Thus, the error signal ERS supplied by the gate AG 248 to the circuit 30 is forced to 0 by the timer signal TS while the timer 244 has not finished the countdown of the set-point CVAL. The masking of the error signal is lifted when the signal TS changes to 1. At this instant, if the error signal is still on 1 at output of the flip-flop FF 242, the output of the gate AG 248 changes to 1 and the circuit 30 is activated.

As for the signature production block 10, the parameter setting and the activation of the error detection block 20 comprise inserting instructions into the program executed by the CPU 202, including instructions for loading the counting set-point CVAL, for loading the expected signature WS and for activating the timer 244. A sequence incorporating such instructions is for example as indicated below, using the example described above:

<loading the counting set-point into the register CREG of the timer>
[LOAD TMR][CVAL]
<activation of the timer>
[TMR ON]

```
<loading the expected signature WS into the register REFREG>
[LOAD REFREG][WS]
<loading the masks M1, M2, M3 into the register CONFREG>
[LOAD CONFREG][M1, M2, M3]
<setting the register SREG to 0 >
[RESET SREG]
<execution of the secured sequence >
[READ MEM1][AD1]
[WRITE REGBANK][AD2]
```

Other instructions can be inserted into this program, particularly instructions for reading the registers REFREG 238, CONFREG 230, CREG 246 immediately after they have been loaded, to ensure the values that have been loaded thereinto are correct.

The counting set-point CVAL loaded into the timer 244 is determined by taking into account the execution time of the instructions for loading the signature WS, for loading the masks M1-M3 and for resetting the signature register SREG 226, since these instructions are here interposed between the instruction for activating the timer 244 and the instructions forming the secured sequence itself. Generally speaking, the counting value is chosen so that the time interval measured by the timer 244 starting from its activation expires after the execution of the secured sequence has finished. Thus, when the masking of the error signal is lifted (TS=1), the error signal must have changed to 0 in the meantime. The current signature must therefore, at a given instant, be equal to the expected signature, so that the output of the comparator COMP 240 changes to 1 and the output/Q of the flip-flop FF 242 changes to 0. In the opposite case, the lifting of the masking of the error signal ERS irremediably causes the application of the active value of the error signal to the error management circuit 30.

Thus, the supply of the error signal is protected against any program derailment. The secured sequence is not followed by an instruction for comparing signatures, as such a comparison is hardware performed in real time. Thus, if a fault injection causes the program to derail during the execution of the secured sequence, the current signature is never equal to the expected signature and the error management circuit 30 is activated when the masking time has elapsed.

In summary, the integrated circuit 200 according to an embodiment of the present invention is put by default into an error mode which is temporarily masked by the timer 244, i.e., a potential error mode, and automatically switches into an unmasked error mode, i.e., an active error mode, when the time interval measured by the timer 244 expires, unless the current signature has become equal to the expected signature in the meantime.

For the sake of simplicity, various signals the provision of which is within the understanding of those skilled in the art have not been described above, particularly read/write signals and signals for selecting the registers present in the blocks 10, 20.

It will be understood by those skilled in the art that various alternative embodiments and enhancements of the various aspects and embodiments of the present invention are possible. Thus, in one alternative embodiment illustrated in FIG. 5, the flip-flop FF 242 is removed, the error signal ERS is directly supplied by the comparator COMP 240 and a means for starting and stopping the signature calculation circuit SCCT 222 is provided, such as the switching module 250, which may be, for example, a switching means controlled by software, which enables the application of the clock signal CK1 to the circuit SCCT 222 to be inhibited. Instruction codes for starting and stopping the circuit SCCT 222 are also provided, such as codes START SCCT and STOP SCCT for example, and are inserted into the program, respectively before and after the sequence to be secured. For example, the sequence described above is modified as follows:

```
[LOAD TMR][CVAL]
[TMR ON]
[LOAD REFREG][WS]
[LOAD CONFREG][M1, M2, M3]
[RESET SREG]
<starting the signature calculation circuit>
[START SCCT]
[READ MEM1][AD1]
[WRITE REGBANK][AD2]
<stopping the signature calculation circuit>
[STOP SCCT]
```

Figure 5:
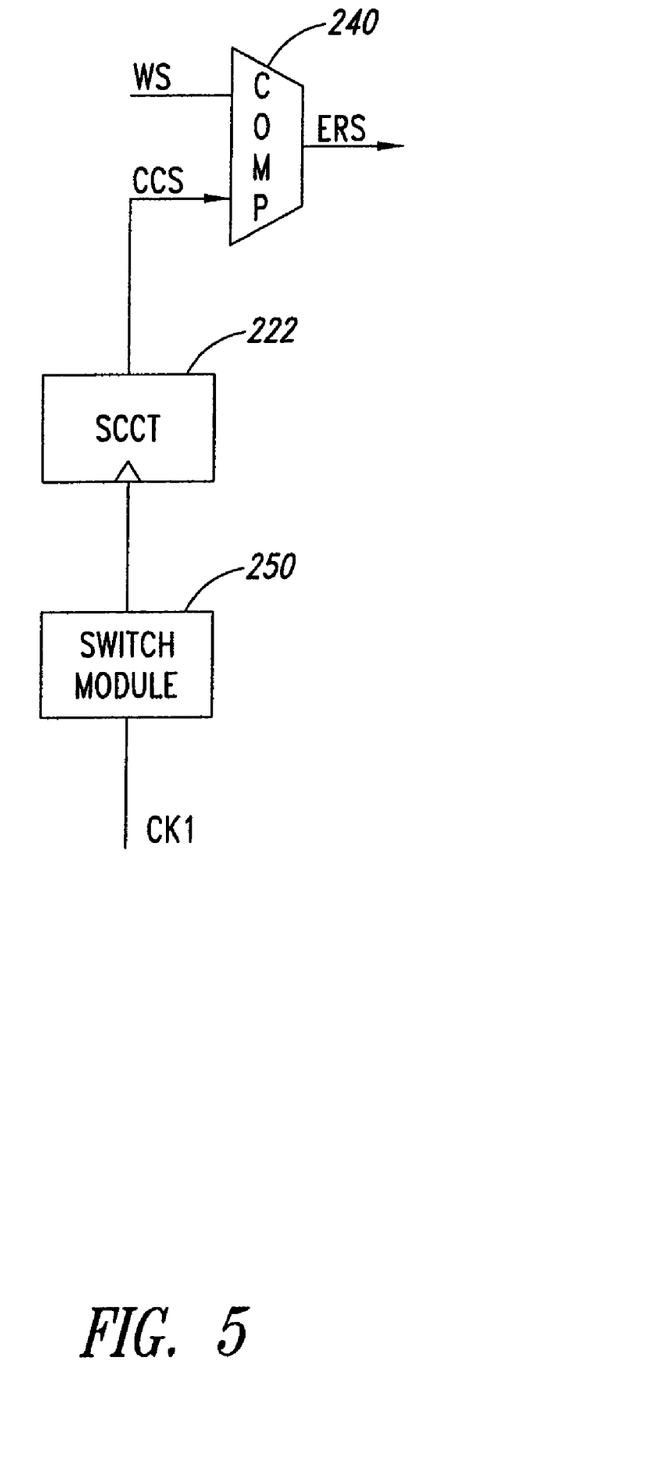
FIG. 5 is a functional block diagram of an embodiment of a circuit for starting and stopping a signature production circuit.

Furthermore, the calculation of the expected signature, in this case, takes into account operations that the CPU 202 performs before the circuit SCCT 222 is effectively stopped. In particular, these are the cycles of reading the instruction STOP SCCT (fetch cycles) which occur before the actual execution of the instruction code.

The term "computer-readable medium" as used herein refers to any medium that participates in providing instructions to a system or a processor for execution. Such a medium may take many forms, including but not limited to, non-volatile media, volatile media, and transmission media. Non-volatile media includes; for example, hard, optical or magnetic disks. Volatile media includes dynamic memory. Transmission media includes coaxial cables, copper wire and fiber optics. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to computer system can receive the data on the telephone line and use an infrared transmitter to convert the data to an infrared signal. An infrared detector coupled to a system bus can receive the data carried in the infrared signal and place the data on system bus. The system bus carries the data to system memory, from which a processor retrieves and executes the instructions. The instructions received by system memory may optionally be stored on storage device either before or after execution by the processor.

Generally speaking, after reviewing the specification those skilled in the art will be able to provide various other embodiments of error detection enabling an integrated circuit to be put by default into a potential error mode and the error mode to be rendered active at the end of the counting of a time interval, unless the current signature has become equal to the expected signature in the meantime.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method, comprising:
executing a sequence of instructions on an integrated circuit;
monitoring execution of the sequence of instructions, the monitoring including,
selecting, from a plurality of deterministic and nondeterministic logic signals on the integrated circuit, sets of deterministic logic signals involved in execution of the sequence of instructions;
producing current cumulative signatures based on current selected sets of deterministic logic signals and previous cumulative signatures; and
comparing a final current cumulative signature produced during monitoring of execution of the sequence of instructions with an expected signature; and
generating a signal indicative of an injected error based on the comparing, wherein the monitoring and generating are performed by the integrated circuit.

2. The method of claim 1 wherein:
the sequence of instructions is executed on a central processing unit of the integrated circuit;
a clock signal of the central processing unit paces the producing of current cumulative signatures; and
a current cumulative signature is produced at each clock cycle of the central processing unit during execution of the sequence of instructions.

3. The method of claim 1 wherein each set of selected deterministic logic signals comprises at least part of one of:
an address corresponding to a peripheral element of a central processing unit of the integrated circuit;
a signal for controlling the peripheral element;
a signal indicative of an operation in progress;
a signal indicative of data forming operands; and
a signal indicative of data forming instruction codes.

4. The method of claim 1 wherein a signal is excluded from a selected set of deterministic signals if it is not deterministic during a clock cycle in which the set is selected.

5. The method of claim 1 wherein the current cumulative signatures are produced by a hard-wired logic signature calculation module comprising parallel inputs linked to a plurality of points of the integrated circuit through which deterministic and non-deterministic logic signals pass, and wherein the selecting comprises inhibiting inputs of the signature calculation circuit when corresponding logic signals are not deterministic.

6. The method of claim 5 wherein inputs of the signature calculation module are inhibited by a configurable hard-wired logic masking circuit.

7. The method of claim 5 wherein the inputs of the signature calculation module are connected to a data bus, to an address bus, and to a control bus conveying signals for controlling peripheral elements of a central processing unit of the integrated circuit.

8. The method of claim 1 wherein the producing current cumulative signatures includes using a linear feedback shift register.

9. The method of claim 1 wherein the generating the signal indicative of an injected error comprises:
during the execution of the sequence of instructions, producing an error signal having an active value by default while a current cumulative signature is different from the expected signature;
masking the error signal for a determined time interval corresponding substantially to a presumed duration of execution of the sequence of instructions; and
unconditionally lifting the masking of the error signal when the determined time interval expires.

10. An integrated circuit, comprising:
a processor configured to execute a sequence of instructions;
a signature production module configured to:
select, from a plurality of deterministic and nondeterministic logic signals on the integrated circuit, sets of deterministic logic signals involved in execution of the sequence of instructions; and
produce current cumulative signatures based on sets of deterministic logic signals; and
an error injection detection module coupled to the signature production module and configured to produce a signal based on a comparison of a current cumulative signature with an expected final cumulative signature.

11. The integrated circuit of claim 10, further comprising:
a data bus;
a control bus; and
an address bus, wherein the signature production module includes a signal masking module configured to mask non-deterministic signals on the data bus, the control bus and the address bus.

12. The integrated circuit of claim 10, further comprising a peripheral device wherein the signature production circuit is configured to select deterministic signals related to the peripheral device.

13. The integrated circuit of claim 12 wherein the deterministic signals related to the peripheral device include at least one of:
an address corresponding to the peripheral device; and
a control signal related to the peripheral device.

14. The integrated circuit of claim 12 wherein the peripheral device is a cryptographic calculation module.

15. The integrated circuit of claim 10 wherein the error injection detection module is configured to compare the current cumulative signature with the expected final cumulative signature after execution of the sequence of instructions is complete.

16. The integrated circuit of claim 10 wherein the error injection detection module is configured to compare the current cumulative signature with the expected final signature during execution of the sequence of instructions.

17. The integrated circuit of claim 10 wherein the error injection detection module comprises:
a comparator; and
an error masking module coupled to the comparator and configured to mask an output of the comparator when the current cumulative signature is not expected to be equivalent to the expected final cumulative signature.

18. The integrated circuit of claim 10, further comprising:
an error management module coupled to the error injection detection module.

19. A non-transitory computer-readable medium containing instructions which when executed configure an integrated circuit to perform a method, the method comprising:
  executing a sequence of instructions;
  monitoring execution of the sequence of instructions, the monitoring including,
    selecting, from a plurality of deterministic and nondeterministic logic signals on the integrated circuit, sets of deterministic logic signals involved in execution of the sequence of instructions;
    producing current cumulative signatures based on current selected sets of deterministic logic signals and previous cumulative signatures; and
    comparing a final current cumulative signature produced during monitoring of execution of the sequence of instructions with an expected signature; and
  generating a signal indicative of an injected error based on the comparing.

20. The non-transitory computer-readable medium of claim 19 wherein the selected sets of deterministic logic signals comprise at least part of an address signal, a control signal and a data logic signal.

21. The non-transitory computer-readable medium of claim 19 wherein the each of the plurality of signals is deterministic during at least one cycle of execution of the sequence of instructions.

22. A system comprising:
  a smart card; and
  an electronic device coupled to the smart card, wherein the system includes an integrated circuit, the integrated circuit having:
    a processor configured to execute a sequence of instructions;
    a signature production module configured to:
      select, from a plurality of deterministic and nondeterministic logic signals on the integrated circuit, sets of deterministic logic signals involved in execution of the sequence of instructions; and
      produce current cumulative signatures based on sets of deterministic logic signals; and
    an error injection detection module coupled to the signature production module and configured to produce a signal based on a comparison of a current cumulative signature with an expected final cumulative signature.

23. The system of claim 22 wherein the integrated circuit is including in the smart card.

24. The system of claim 22 wherein the integrated circuit is included in the electronic device.

25. The system of claim 22 wherein the electronic device is a set top box.

26. The system of claim 22 wherein the electronic device is a cellular device.

27. The system of claim 22 wherein the error injection detection module comprises:
  a comparator; and
  an error masking module coupled to the comparator and configured to mask an output of the comparator when the current cumulative signature is not expected to be equivalent to the expected final cumulative signature.

28. The system of claim 22 wherein the integrated circuit comprises:
  an error management module coupled to the error injection detection module.

* * * * *